United States Patent Office 3,299,403
Patented Jan. 17, 1967

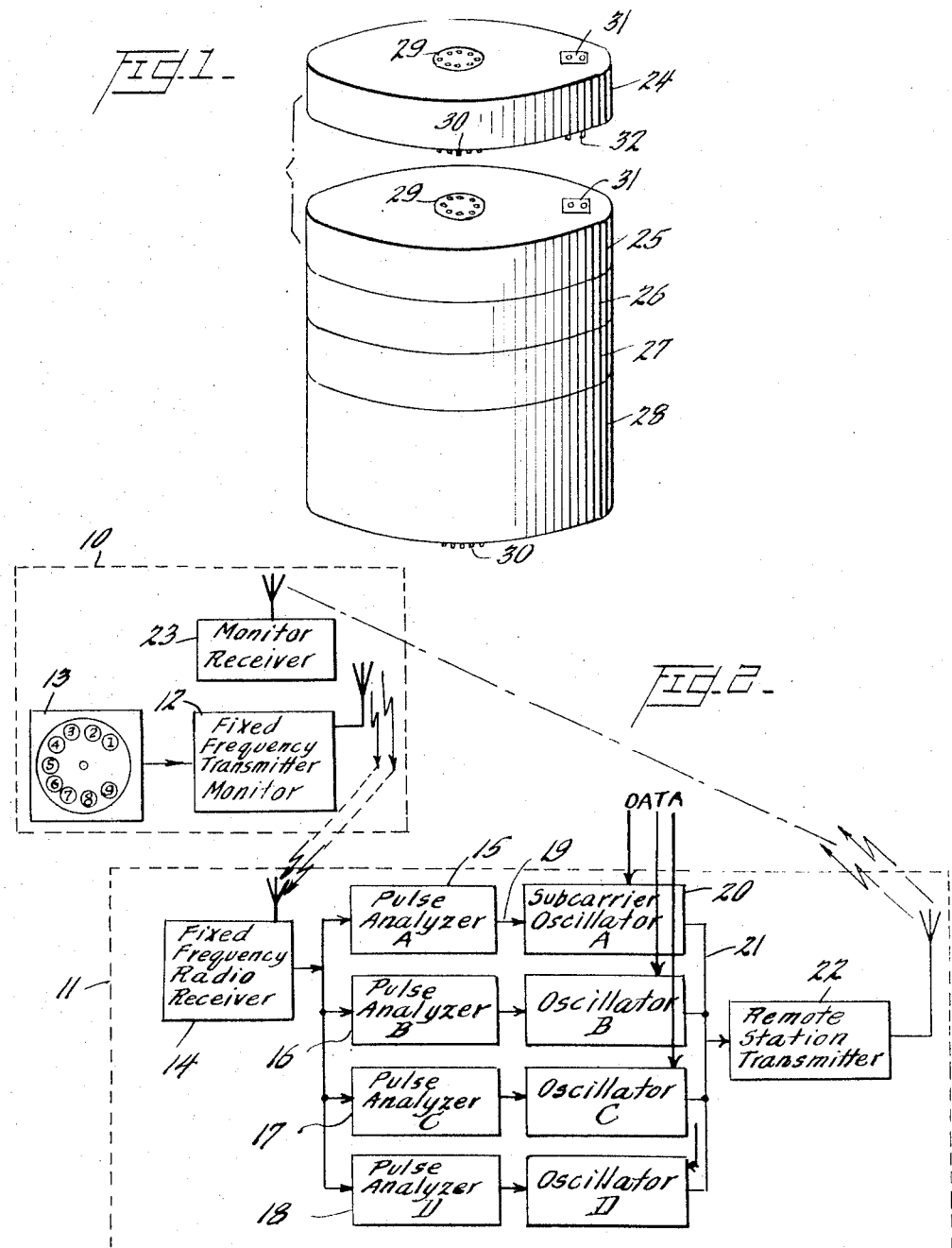

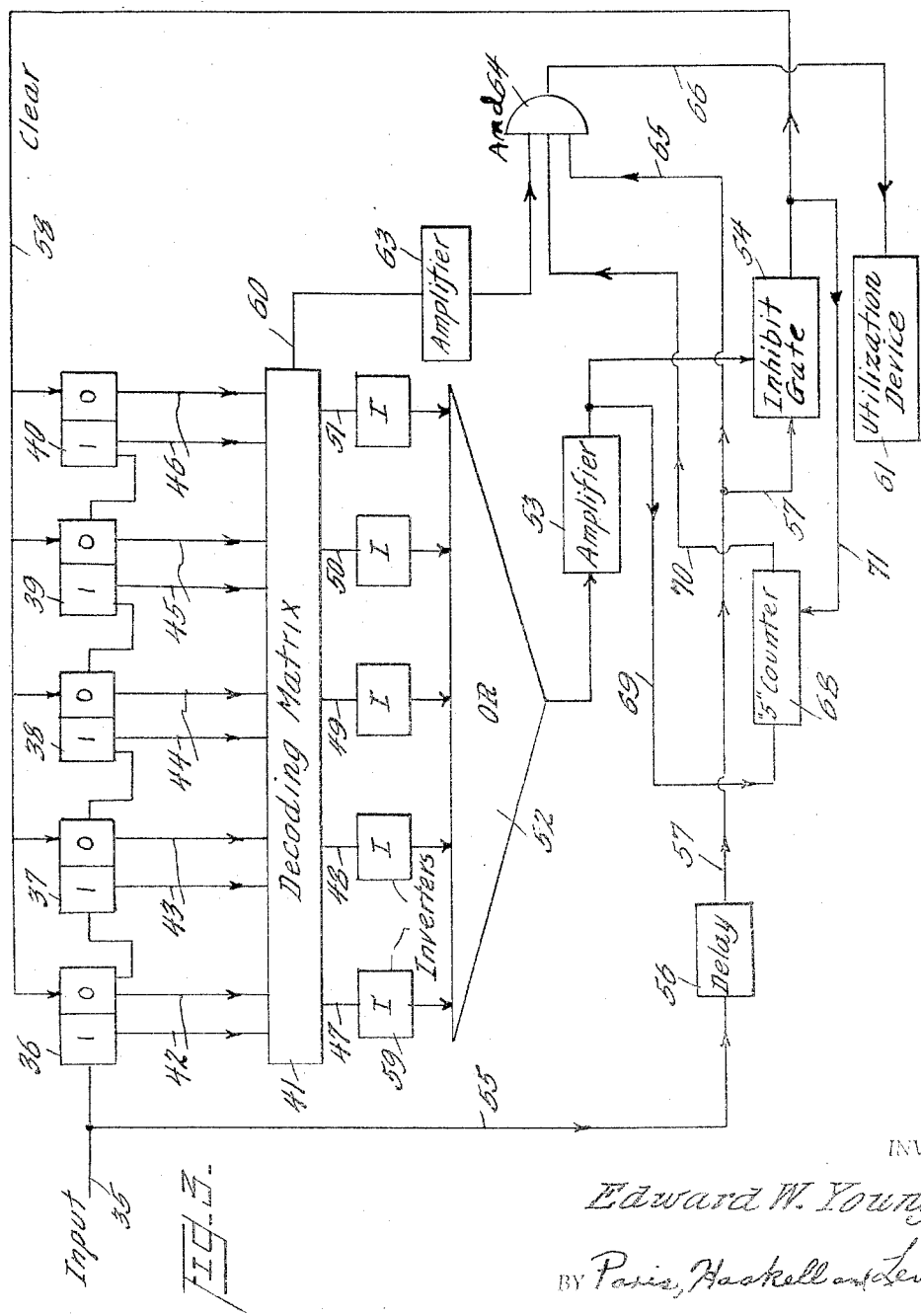

3,299,403
MULTIDIGIT PULSE CODE RESPONSIVE SYSTEM
Edward W. Young, Trevose, Pa., assignor, by mesne assignments, to United Aircraft Corporation, a corporation of Delaware
Filed Mar. 30, 1962, Ser. No. 183,873
10 Claims. (Cl. 340—151)

This invention generally relates to improvements in digitally operating pulse code analyzers for such purposes as automatic command telemetering and the like, and is particularly concerned with such circuits that are adapted to be embodied in miniaturized modular circuit packages for detachable interassembly to permit the synthesizing of a wide variety of telemetering systems, control systems or the like.

Although numerous other applications for the invention exist, the present invention is particularly concerned with providing an analyzer for a system of automatic command telemetering of information and data from a series of remote locations. In such systems, a central monitoring station produces pulse coded command signals that are directed to a plurality of remote stations that it is desired to individually question. At each remote station there is provided one or more code analyzers that automatically recognizes only a preselected coded command from the monitor and upon receiving and responding to its preselected command enables that station to automatically relay information back to the monitor.

Systems of this type quite frequently become unusually complex where a large number of remote stations are involved and/or where a number of different channels of information and data is to be obtained from each remote station. In either case a large number of analyzers and associated telemetering apparatus is required with each different one of these analyzers being selectively responsive to only one different command signal.

To add further to the difficulty and complexity of such systems, there are many applications in which the remote stations are located in inaccessible regions or are made portable or continually movable with respect to the central monitor, such as in the case of ocean floating buoys, air borne weather stations and the like. In such applications, the remote station equipment is also required to be very small, lightweight and battery powered yet capable of continuous dependable operation over long periods of time without access to the station for replacement or repair of faulty equipment or replacement of the batteries.

According to the present invention, there is provided an improved pulse code analyzer for use in such remote stations and that is embodied in the form of a miniature, modularly packaged electronic circuit that may be detachably interconnnected with other units to enable the synthesizing of a wide variety of different systems for telemetering or other applications. Each such unit is provided as an independently functioning circuit of miniature size and lightweight and adapted to be battery powered with small electric current consumption. The units are also substantially identical in circuit configuration but with each being preset to respond to a differently coded pulse command signal and with each having an output for automatically energizing a different miniature radio telemetering transmitter or other apparatus upon recognizing its preset command. These units may be employed either singly for controlling a single channel answer back telemetering system or the like located at the different remote stations or may be detachably interconnected in groups providing compact system packages to control multichannel telemetering systems located at the remote stations.

Very generally according to the invention, the functioning of each of the analyzers in such systems may be likened to an automatic telephone dialing system, with each analyzer responding only to a different code of numbers being received in a given sequence. Each digit of the code number is comprised of a group of pulses, with the number of pulses in each group corresponding to that digit. For any one of the analyzers to respond to a code, not only must each digit being sequentially received correspond to a number preset in the analyzer but the different digits of the code must all be received in a predetermined order corresponding to the preset sequence established for that analyzer. This mode of operation permits a large number of analyzers to be employed in a system using the same individual digit numbers but having these numbers rearranged in different sequences.

According to one preferred mode of operation, each group of pulses received, corresponding to a different digit of the code, is accumulated in a counter mechanism which is preset to respond to only that number. If the number received is the same as that preset, a signal is produced indicating this correspondence and the analyzer continues to function by responding to the next succeeding group of received impulses and subtotaling the pulses of both groups. If after the second group of pulses has been added, the sum of the first and second groups corresponds to a second preset number, a second signal is produced signifying this correspondence. In the same manner, each succeeding group of pulses is entered and subtotaled, and signals are produced signifying the correspondence or lack of correspondence of that subtotal with a preset number until all digits of the code have been received. In the event that all of the subtotals and the end total are correct, the analyzer functions to recognize the code and then produces an output signal to perform a desired function. Thus each digit of code is compared in sequence with a number preset and only in the event of correspondence of all digits, in a given order, does the analyzer function. On the other hand in the event that any one of the subtotals or the end total does not correspond to the particular number preset, the counter is reset and the analyzer cannot function to produce a controlling output signal.

It is accordingly a principal object of the invention to provide an improved pulse code analyzer responsive to a multidigit pulse number.

A further object is to provide such an analyzer having a minimum number of components compatibly with the function performed and capable of being embodied in a miniature modular housing of lightweight and small size.

Another object is to provide such a miniature circuit adapted to be battery powered and having low current consumption.

A still further object is to provide such a circuit having an improved mode of operation permitting a large number of such analyzers to be employed in a system using a minimum number of code digits.

Still another object is to provide such a circuit wherein different preset codes may be easily embodied without extensive changes in the circuitry and without the addition or deletion of components.

Many additional objects and advantages will be more readily appreciated by those skilled in the art after a detailed consideration of the following specification taken with the accompanying drawings, wherein:

FIG. 1 is a perspective view illustrating one preferred construction of the individual analyzer circuits in detachable, miniature plug-in housings.

FIG. 2 is an electrical block illustrating a typical command telemetering system that may be provided by the modular assembly of FIG. 1.

FIG. 3 is an electrical block diagram representation of the preferred circuit for each pulse code analyzer according to the invention.

Figure 4:
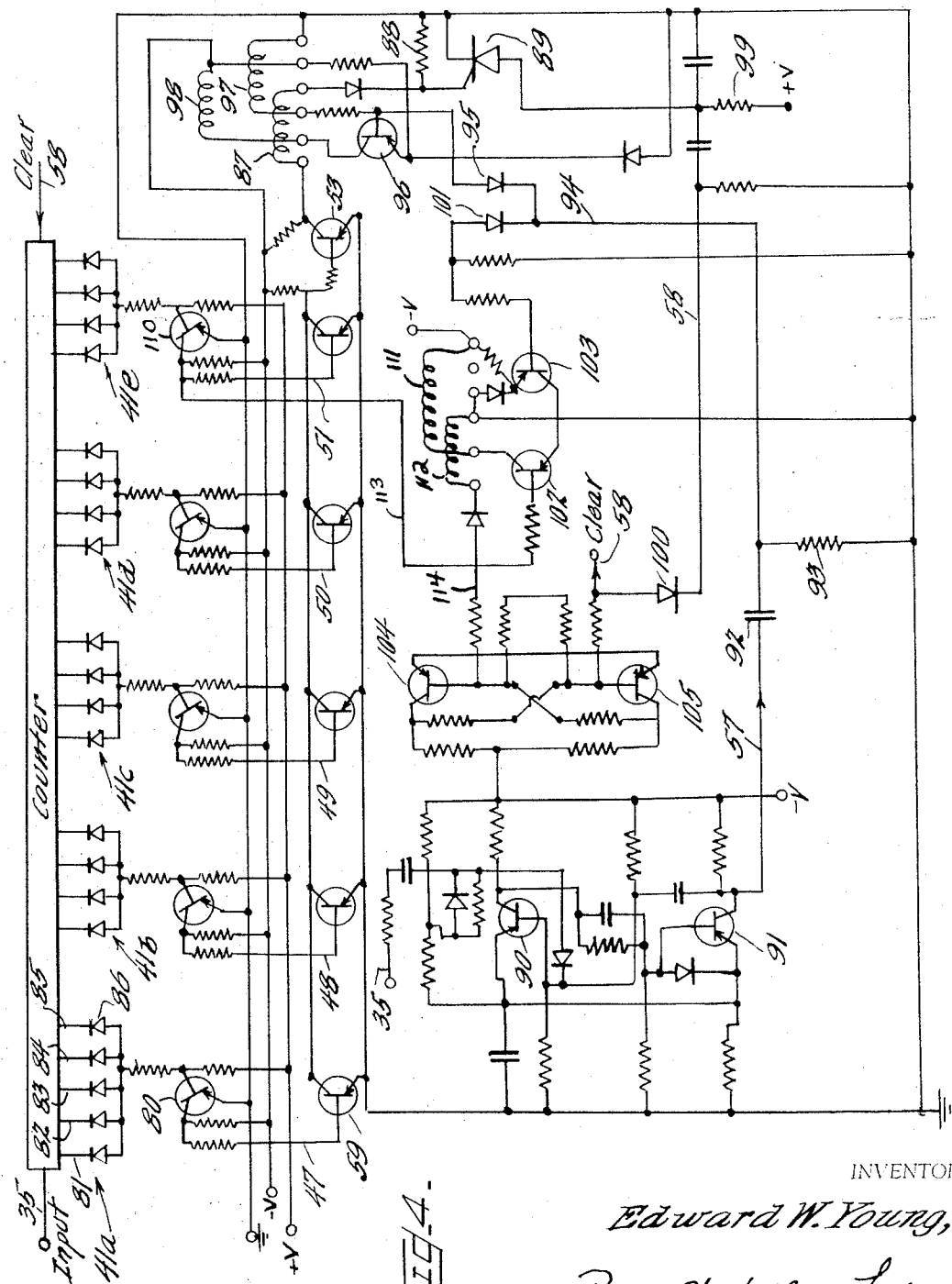
FIG. 4 is an electrical schematic diagram illustrating one preferred electrical circuit coresponding to the functional block diagram of FIG. 3.

Referring now to the drawings for a detailed consideration of a preferred embodiment of the invention, there is shown in FIG. 2 a schematic representation of a typical command control radio telemetering system employing the invention and illustrating within a dotted enclosure 10 a central monitoring system, and within the dotted enclosure numbered 11, one of the many remote stations that is adapted to be controlled or interrogated by command signals produced by the monitoring station 10.

As shown, the monitoring station 10 includes a command transmitter, preferably operating at a fixed radio frequency and is adapted to be modulated by means of a conventional telephone-type dialing mechanism 13 or the like, to produce uniform radio frequency impulses. For example, if the number 2 is dialed, the transmitter 12 produces two radio frequency pulses in sequence to represent the first digit of the code number 2.

At the remotely located monitoring station 11, these radio frequency impulses are received and demodulated by radio receiver 14 and the impulses are thence directed in parallel to enerigze all of the pulse analyzers, such as 15, 16, 17 and 18, being connected in parallel as shown to the output of the radio receiver 14. Each of the analyzers 15 to 18, inclusive, are preset to respond to a given multiple-digit code, and consequently, if the first preset digit in any one or more of these analyzers is the number 2, according to the above example given, that analyzer will respond to the first group of two impulses conveyed by the radio receiver 14. In a similar manner, each of the other digits of the code number is then dialed or otherwise produced at the monitoring station 10 and received at the remote station 11. If one of the pulse analyzers 15 to 18, inclusive, is preset to respond to the complete multiple digit code, in the sequence in which the code is dialed, that one of these analyzers will recognize the complete code and respond thereto.

Presupposing that the first analyzer 15 is activated upon completion of the dialed code, it then produces an output control impulse over line 19 to energize a subcarrier oscillator 20 connected thereto which, in turn, produces its signal over line 21 to modulate the remote station transmitter 22, thereby to transmit the information over radio beam back to a receiver 23 located at the monitoring station 10 where the information or telemetered data is demodulated and recorded or otherwise employed.

In the typical telemetering system as shown, each of the subcarrier oscillators, such as oscillator 20, functions at a different subcarrier frequency from the others and is adapted to be modulated by a data signal to be telemetered as is well known to those skilled in the art. This modulated subcarrier signal in turn modulates the station transmitter 22 to transmit this data signal back to the original monitoring station.

In a similar manner, if the operator at the monitoring station 10 desires to interrogate any other one of the telemetering channels, he merely dials the code number corresponding to that preset in the desired one of the pulse analyzers 15 to 18, inclusive, thereby to actuate that analyzer and permit its associated oscillator to convey the information backward to the monitoring station via the radio link disclosed.

As is believed evident at this point, the remote station 11 may be merely one location of possibly many in a complete telemetering system, all of which may contain a number of pulse analyzers such as 15 to 18, inclusive, with one analyzer being provided for each channel of information that it is desired to interrogate. All of the pulse analyzer mechanisms may be preset to respond to a different multidigit code number and consequently any one of the channels at any one of the numerous remote stations may be dialed or commanded from the monitoring station by selection of the proper code number corresponding to that analyzer.

FIG. 1 illustrates the preferred miniaturized construction of the individual circuit modules and the manner of detachably interconnecting the modules at the remote station to synthesize the desired number of channels. As shown, each of the individually functioning circuits corresponding to those within the separate blocks of FIG. 1, are contained within a completely enclosed miniature wafer-shaped housing or module 24 to 28, inclusive, that are adapted to be stacked and electrically interconnected one above the other in a cascaded array to provide a system of minimum space and weight as is desired. Each of the modular housings is provided with a multiterminal female connector 29 being located centrally at one side thereof and a complementary multiterminal male connector part 30 located at the other side thereof, whereby when the modules are assembled, as shown, electrical interconnections are provided between all of the modules to complete the electrical system as indicated in FIG. 2. The multiterminal connectors 29 and 30 located centrally of the modules are generally allocated for the purpose of transmitting separate and independent input and control signals to each of the modules, and additional connectors such as 31 and 32 also located on the modules may be employed as necessary for the purpose of connecting the battery potentials, ground potential and other energizing sources to the circuitry within the modules. The details of the preferred electrical connector means and the manner of providing separate and individual energization of the modules within the serial array, such as shown in the circuit of FIG. 2, is disclosed in a copending application assigned to the same assignee, now Patent No. 3,267,334, and further details are not believed necessary for an understanding of the present invention.

FIG. 3 illustrates in block diagram form one preferred circuit for the pulse code analyzers as indicated by each of the units 15 to 18 of FIG. 2. As will be recalled from the earlier discussion above each of these analyzers responds to each succeeding digit of the code in sequence to determine whether that digit has been preset into the analyzer. In the event that the digit received is correct, it is retained in the analyzer and upon the next succeeding digit being received, the analyzer subtotals the first two digits and makes a second determination. On the other hand, if the second digit or any subsequent received is not correct, the subtotal is not correct, and the analyzer cannot recognize the code and does not respond thereto. Only if all of the individual subtotals and the final total conform to the numbers preset in the analyzer, does the analyzer recognize the multidigit code and provide the correct response.

Referring to FIG. 3 for an understanding of the preferred logic circuitry employed to perform this function for a five digit code, the series of pulses corresponding in number to each received digit of the code are initially entered into the analyzer over an input line 35 and directed to the first binary state of a multistage binary counter comprising stages 36 to 40, inclusive, as shown. These pulses are accumulated to change the on-off condition of the individual stages of the counter corresponding to the number of impulses received.

To determine whether this first digit number received is correct, a present decoding matrix 41 is provided and connected to the various stages of the counter over pairs of lines 42 to 46 as shown. This preset matrix 41 essentially comprises five different read-out circuits being connected to the counter stages, each circuit of which responds to the counter summing a different present number to produce an impulse over a different one of output lines 47 to 51, leading from the matrix 41. Thus, if the first digit (series of pulses) being entered into the counter is correct, a signal is produced over the first matrix output line 47 signifying that the digit received corresponds to the number preset in the first read-out of the matrix. This first output signal is directed through an inverter circuit 59, and through an "or" circuit 52, and an amplifier 53 leading to an inhibit gate circuit 54, to open inhibit gate circuit 54 and not permit energization therethrough.

In the meanwhile, the first group of impulses over input line 35, corresponding to the first digit of the code being received, is also directed downwardly over line 55 to a delay circuit 56 where the first pulse of this group is delayed for a short time interval and then permitted to pass over line 57 to an input of the inhibit gate circuit 54. Since gate 54 has been previously opened as described above, this delay pulse cannot pass through the gate 54 and onto line 58 which leads to the clear or reset line of the counter stages. Thus, if the first digit received by the counter corresponds to that preset in the matrix, a signal is produced which enables this digit to remain in the counter stages. On the other hand, if the first digit received by the counter does not correspond to the number preset in the matrix, a signal is not produced over the first matrix output line 47 to energize the inhibit gate 54, and the inhibit gate 54 therefore remains closed and permits the time delayed impulse over line 57 to pass through the gate 54 and pass over the clear line 58 back to the counter stages, thereby resetting the counter to its zero or cleared condition.

Presupposing that the first digit of the code is correct and the number received remains stored in the counter, the next entry of a group of impulses, corresponding to the second digit, being received over line 35 is then added to the count standing in the counter stages, and a subtotal of the first and second digits is obtained. If this subtotal number is correct and corresponds to that preset in the analyzer, the second output line 48 of the decoding matrix 41 produces a signal which is directed through an inverter stage 59 to the "or" circuit 52, and thence to the amplifier 53 to energize the inhibit gate circuit 54 as before. The opening of inhibit gate 54 functions in the same manner as previously, preventing the next delayed impulse over line 57 from passing through the gate 54 and clearing the counter, whereby the counter retains the subtotal number comprised of the addition of the first and second digits of the code. On the other hand, if the second digit of the code is not the correct number, the subtotal of the first and second digits does not correspond to the number preset in the decoding matrix 41 and a signal is not generated over line 48 to open the inhibit gate 54. In this case, the delayed pulse over line 57 passes through the inhibit gate 54 and out over the clear line 58 to reset all of the counters to their original zero condition.

As each group of pulses corresponding to the next succeeding digits are received over input line 35, the above sequence of operations is continued and the subtotal obtained is either stored in the stages of the counter or the counter is cleared, depending upon whether that subtotal corresponds to that originally preset into the matrix 41. Thus, the analyzer circuit responds to each succeeding digit of the code being received and either rejects or retains that digit depending upon whether it corresponds to the number originally preset into the analyzer.

Upon the last digit of the code being received, the sequence of operations described above is modified slightly to permit the analyzer to complete its cycle of operations and thereby energize a suitable utilization device (subscriber oscillator) such as is indicated at 61. This is performed as follows. Presupposing that all of the previous digits received have corresponded to those originally preset into the analyzer, the entry of the last group of pulses over input line 35 corresponding to the last digit is again added in the counter to produce a final total count. If this final count corresponds to the final total preset into the last portion of the decoding matrix 41, a signal is produced over line 60 and directed to an amplifier 63 to energize an output "and" gate 64. This signal over line 60 is not directed to the inhibit gate 54 as in the previous comparisons and therefore the inhibit gate 54 remains closed permitting the time delay pulse to pass therethrough and reset the counter, thereby indicating a complete cycle of operations and resetting the counter to its initial condition in preparation for receiving the next code. Additionally, the time delayed impulse over line 57 is also directed upwardly over line 65 to energize the "and" gate 64 whereby the combination of the matrix signal over line 60 and the time delayed pulse over line 65 permits an output pulse to be produced over line 66 to energize the utilization device 61. Thus, an output signal is produced over line 66 after all digits of the code have been received and the analyzer has recognized the code and responded thereto. In the event that any one of the subtotal digits or the final total of the digits does not correspond to that preset in the counter, the counter stages have been previously cleared and therefore the analyzer cannot produce the final total signal over matrix line 60 serving to actuate the utilization device 61.

In the circuit as described above, however, there still exists the possibility of certain ambiguities whereby the analyzer may unwittingly respond to an incorrect code of digits. One manner in which this may come about is if the subtotal of the first two numbers of the preset code is less than the number 9, e.g., the numbers 4 and 5. In this example, even if the first digit received by the analyzer is not the correct number 4 but is instead incorrect, whereby the counter is reset, the second digit received may also be incorrect but may be large enough to provide the correct subtotal, in this case 9. Should this occur, together with the remaining condition that the next succeeding digits in the code received are correct, the analyzer would normally accordingly respond to the wrong code.

To prevent any such ambiguity as described, there is provided an additional counter indicated at 68 that is adapted to be energized by each of the matrix produced signals coming from amplifier 53 and being directed over line 69. For a five digit code, the counter 68 is preferably a scale of five counter and accordingly must respond to five signals from the matrix 41 before producing an output signal over its line 70. The input signals over line 69 being directed to counter 68 are only produced whenever each and every one of the subtotals entered into the counter are correct and therefore the counter 68 will not produce an output signal over line 70 leading to the "and" circuit 64 unless all of the subtotals in the counter are correct. Consequently, assuming the ambiguity condition as described above, if the first and second digits received are not correct but their subtotal is correct, and the remaining digits of the code received thereafter are correct, only four subtotal signals will be produced over line 69 to energize the counter 68. Under this condition, at the termination of the cycle of operations an output signal will not be produced over line 70 to energize the "and" gate 64 and consequently despite the fact that the "and" gate may be energized properly by the total agreement signal coming from amplifier 63, and by the delayed signal over 57, the absence of the third signal over line 70 from counter 68 prevents a pulse being transmitted by the "and" circuit 64 to the utilization device 61.

The additional counter 68 is also cleared or reset to commence a new cycle of operations by the delayed clear pulse being produced over line 58, which clear pulse is directed at the end of each cycle of operations downwardly over line 71 to reset the counter 68 in the same manner as it functions to reset the main counter stages 36 to 40, inclusive.

Although the circuit as described above has been illustrated for a five digit code, it is believed evident to those skilled in the art that essentially the same circuit configuration having fewer or greater number of components may be provided to recognize either a greater or lesser digit code as is desired.

FIG. 4 schematically illustrates a preferred electrical circuit corresponding to the block diagram representation of FIG. 3. As shown, each portion of the decoding matrix 41 and indicated at 41a, 41b, 41c, 41d and 41e, is comprised of essentially a coincidence type circuit having a series of lines such as 81 to 85, inclusive, being connected to predetermined different ones of the stages 36 to 40 of the counter, whereby when all of such preselected stages indicate a given preset count condition, a coincidence impulse is produced and directed to the base electrode of a transistor 80, energizing the transistor 80 into conducting condition. In each of the lines 80 to 85, inclusive, of the first section of the matrix 41a, there is provided a diode 86 to prevent back energization of the transistor 80.

In each of the other sections of the decoding matrix, the arrangement is generally the same, with each section being provided with a series of coincidence lines connected to different preselected ones of the stages of the counter and being responsive to a preset count received by the counter to energize their asociated transistors such as transistor 80.

When the matrix transistors 80 are rendered conducting by the counter accumulating a predetermined count, a voltage signal is obtained from the collector electrodes thereof and over line 47 to energize an inverter transistor 59 and render the inverter transistor 59 conducting. The inverted transistors, such as 59, for the remaining sections of the decoding matrix are connected in parallel, as shown, whereby whenever any one of these transistors is rendered conducting, a change in the voltage at collector electrode is directed to the base electrode of transistor 53 functioning as an amplifier. Such voltage change renders transistor amplifier 53 in a more conductive condition drawing additional current between its collector and emitter electrodes thereof and consequently grounding one end of winding 87. The opposite end of winding 87 is in series with resistor 88 having its opposite terminal connected to ground. Consequently, upon a signal being produced by any section of the decoding matrix 41, a zero bias voltage is developed across resistor 88. The resistor 88 is connected to bias a silicon control switch 89, whereby when the resistor 88 is grounded, the switch 89 is maintained in a non-conducting condition.

The input impulses over line 35 are also directed to energize the control electrode of transistor 90 which is interconnected with a transistor 91 in a somewhat conventional one-shot multivibrator or time delay circuit, corresponding to the block labeled 56 in FIG. 3. At the termination of the pulse provided by this one-shot multivibrator, a changing output signal of proper polarity is provided over line 57 which is passed through a differentiating circuit, comprising a capacitor 92 and resistor 93, to provide a pulse which is directed upwardly over line 94 and through diode 95 to the base electrode of a transistor 96 and thence through winding 97 to ground. Transistor 96 may be generally considered as a counterpart of transistor 53 in that its collector and emitter electrodes are connected in series with a winding 98 located on the same magnetic core as is windings 87 and 97. Normally conduction of this transistor 96 energizes winding 98 to induce a voltage in winding 87 of the proper polarity to fire the silicon control rectifier 89 and thereby initiate the reset or clear pulse for resetting the counter as discussed above. However, in the event that the amplifier transsistor 53 has been rendered conducting in response to the decoding matrix 41, this reset impulse is nullified and silicon control rectifier 89 remains in a nonconducting condition. On the other hand, in the event that transistor 53 has not been previously rendered conducting in response to the decoding matrix 41, the latter impulse as described above through winding 98 induces a voltage in secondary winding 87 of such polarity as to fire the silicon control rectifier 89 and produce a voltage drop across resistor 99 in the lower right-hand portion of the circuit. This voltage drop in turn produces an impulse over the clear line 58 which is transmitted through diode 100 to the clear line 58 leading to the counter stages 36 and 40, thereby to reset the counter into its zero or initial condition.

After all digits of the code have been entered and compared as described above, the last time delayed pulse over line 94 is also directed through diode 101 to the base electrode of transistor 103 rendering this transistor conductive and connecting its collector electrode to ground potential. Transistor 103 is connected in series with transistor 102 in a gate circuit whereby if both transistors 102 and 103 are jointly made conductive, a pulse is directed through transformer winding 111 to induce an output pulse in secondary winding 112. The transistor 102 is rendered conductive by a pulse over line 113 received at its base electrode and this pulse is obtained from the collector of transistor 110 in the last section of the matrix after the last digit has been received and found to be correct. Thus when the last correct digit has been received, the gate transistor 102 is rendered conductive and shortly thereafter the delayed impulse over line 94 renders the other gate transistor 103 conductive thereby to pulse the winding 111 and induce an output pulse in winding 112 leading to the utilization device.

The utilization device may be a relay or other form of switch, such as the flip-flop circuit comprising transistors 104 and 105, as shown. In this case, the output pulse from winding 112 passes over line 114 leading to the base of transistor 104, thereby flipping the condition of the flip-flop circuit to signify that the complete code received is correct. This output flip-flop circuit may in turn control or trigger the operation of a telemetering responding mechanism, such as a subcarrier oscillator 20 shown in FIG. 2, or it may perform other functions as is now believed evident to those skilled in the art.

The circuit of FIG. 4 does not illustrate details of the pulse counter mechanism, stages 36 to 40, nor details of the ambiguity preventing pulse counter 68, both as shown in FIG. 3. However, pulse counters comprised of cascaded flip-flop stages or other type counter circuits that may be employed are well known in the art and detailed circuitry illustrating such devices is not considered necessary for an understanding of the present invention.

Many variations in the circuitry described may be made by those skilled in the art without departing from the spirit and scope of this invention and accordingly, this invention should be considered as being limited only for the following claims:

What is claimed is:

1. A multidigit pulse code analyzer comprising:
   a counter means for progressively receiving groups of input pulses representing each digit of the code and subtotaling each group,
   a preset decoding matrix having a plurality of sections each responding to a different succeeding subtotal and producing a correct digit pulse in the event that the subtotal received corresponds to a preset digit,
   means responsive to input pulses representing each digit received to produce a time delayed reset pulse,
   gate means jointly energized by each of said correct digit pulses except for the final correct digit pulse and by all of said reset pulses to reset the analyzer in response to any of said reset pulses and to automatically reset the analyzer in response to the reset pulse occurring after the final correct digit pulse, in the event that a correct digit pulse has not been previously received, and output gate means responsive after all subtotals of the digits have been completed and found correct to produce an output energization.

2. In the code analyzer of claim 1, an ambiguity correcting circuit for responding to each correct subtotal accumulated by the counter and enabling the output energization to be produced only if the number of correct subtotals corresponds to the number of digits in the detected code.

3. In the analyzer of claim 2, said output gate means being jointly energized by a correct digit pulse from said matrix, by said time delayed reset pulse, and by an impulse from said ambiguity correcting circuit to respond only when impulses are received from all three to produce said output energization.

4. An analyzer for a multidigit pulse code wherein each digit of the code comprises a series of substantially uniform pulses representative in number of the digit comprising:
- a pulse counter for receiving the pulses in sequence corresponding to each digit and successively storing each succeeding digit as a series of subtotals and a final total,
- a comparator responsive to the counter for determining after the reception of each digit whether the subtotal in the counter corresponds to a preset number,
- a reset means responsive after each received digit to reset the counter if the subtotal is not correct and responsive to the comparator if the subtotal is correct to disable the reset means from resetting the counter,
- an output circuit being energized by said comparator circuit for producing an output signal only if the subtotals received are correct,
- and an ambiguity correcting circuit for preventing the operation of said output signal until a given number of correct digits are received and each subtotal produced corresponds to a preset number.

5. In a command controlled telemetering transponder system wherein at a central monitoring station a multidigit pulse code is transmitted to selectively interrogate a pluraliy of remote stations and wherein at said remote stations there is provided a plurality of telemetering channels having a pulse code analyzer for each telemetering channel, and a single radio transmitter for all channels each said analyzer responding to a preset transmitted code and activating its associated channel to reply to the monitoring station, each said pulse code analyzers comprising a counter for successively receiving and storing each digit of the transmitted code to provide a series of subtotals thereof, comparator means for determining whether each succeeding subtotal of the digits recived corresponds to a preset number, and output circuit means for producing an output signal only in the event that each subtotal obtained corresponds to a preset number and that the number of correct subtotals obtained corresponds to the preset number of digits of the code.

6. In the system of claim 5, each telemetering channel including a subcarrier oscillator operating at a different frequency and being modulated by a separate data signal, said radio transmitter for each remote station energized by all said oscillators at said station for selectively transmitting a signal from one or more channels, and said pulse code analyzer for each of said channels being responsive to said preselected multidigit code for controlling the operation of its related subcarrier oscillator.

7. A command telemetering system comprising:
- a fixed frequency radio transmitter located at a monitoring station and a manually selectable pulse code modulator for modulating said transmitter to produce a multidigit code of substantially uniform radio frequency pulses, with each digit of the code having a different number of pulses,
- a single fixed frequency radio receiver located at a remote station and responsive to said radio frequency pulses to detect and demodulate the same,
- a plurality of telemetering transponder channels at said remote station,
- each said channel including a data signal controlled variable frequency subcarrier oscillator, a common radio frequency transponder transmitter adapted to be modulated by each said oscillator,
- a pulse code analyzer for each channel energized by said receiver at the remote station and being responsive to a preselected multidigit pulse code to control the operation of said oscillator and transponder transmitter thereby to produce a radio frequency reply corresponding to said data signal when activated by said analyzer,
- a second fixed frequency receiver at said monitoring station operating at the frequency of said transponder transmitter for detecting the data signal,
- at said remote station, said radio receiver, each pulse code analyzer, each subcarrier oscillator, and said transponder transmitter each being incorporated with a substantially identically shaped miniature wafer shaped housing module,
- said modules being serially assembleable in a self supporting stacked array independently of a common electrical chassis,
- and each of said modules being provided with electrical connector means detachably connectable with those preceding and succeeding housings in the array and providing independent electrical connection to each module in the array.

8. In the system of claim 7, said pulse code analyzer including a multistage counter for successively adding each succeeding digit of the code to provide a series of subtotals and a final total,
- and means for successively determining whether each subtotal and final total number received corresponds to a correct number and activating said subcarrier oscillator only in the event that all numbers received are correct and are received in the correct sequence.

9. A remote controlled command telemetering system comprising:
- a single frequency command transmitter located at a monitoring station and means for pulse modulating said transmitter to transmit a multidigit code of sub-comprising a different preselected number of pulses,
- at least one remotely located data sensing station having at least one telemetering transponder at said data station,
- said transponder including a fixed frequency reply transmitter,
- a subcarrier oscillator being modulated by a data signal and in turn modulating said transmitter,
- a pulse code analyzer for controlling the operation of said subcarrier oscillator in response to receiving a preselected multidigit pulse code,
- and a receiver for detecting said multidigit code transmitted by said command transmitter and applying said demodulated pulse code to said analyzer,
- a plurality of data channels at said remote station,
- each channel having a pulse code analyzer preset to respond to a different multidigit code,
- and each channel having a subcarrier oscillator modulated by a different data signal,
- said receiver being connected to apply each demodulated pulse code to all of said analyzers,
- and said fixed frequency transponder transmitter being selectively modulated by said subcarrier oscillators responsively to the pulse code analyzers in the related channel thereof responding to its preselected code.

10. A remote controlled command telemetering system comprising:
- a single frequency command transmitter located at a monitoring station and means for pulse modulating said transmitter to transmit a multidigit code of substantially uniform pulses with each digit of the code comprising a different preselected number of pulses, at least one remotely located data sensing station having at least one telemetering transponder at said data station, said transponder including a fixed frequency reply transmitter, a subcarrier oscillator being modulated by a data signal and in turn modulating said transmitter, a pulse code analyzer for controlling the operation of said subcarrier oscillator in response to receiving a preselected multidigit pulse code, and a receiver for detecting said multidigit code transmitted by said command transmitter and applying said demodulated pulse code to said analyzer, a plurality of data channels at said remote station, each channel having a pulse code analyzer preset to respond to a different multidigit code, and each channel having a subcarrier oscillator modulated by a different data signal, said receiver being connected to apply each demodulated pulse code to all of said analyzers, and said fixed frequency transponder transmitter being selectively modulated by said subcarrier oscillators responsively to the pulse code analyzers in the related channel thereof responding to its preselected code, all of said analyzers, subcarrier oscillators and said receiver and transponder transmitter being incorporated within a substantially identically shaped miniature housing module, said housing modules being serially assembleable in a self supporting stacked array independently of a common electrical chassis, and each of said modules being provided with detachable electrical connector means for providing independent electrical connection to each module in the array.

References Cited by the Examiner
UNITED STATES PATENTS

| | | | |
|---|---|---|---|
| 2,717,370 | 9/1955 | Piper | 340—151 |
| 2,719,284 | 9/1955 | Roberts et al. | 340—151 |
| 2,864,943 | 12/1958 | Schultz | 340—151 X |
| 2,929,048 | 3/1960 | Berger et al. | 340—164 |
| 3,046,526 | 7/1962 | Scantlin | 340—164 |
| 3,080,547 | 3/1963 | Cooper | 340—164 |
| 3,226,679 | 12/1965 | Malone | 340—164 |

NEIL C. READ, *Primary Examiner.*

L. A. HOFFMAN, H. PITTS, *Assistant Examiners.*